(12) United States Patent
Avitzour

(10) Patent No.: US 10,545,216 B2
(45) Date of Patent: Jan. 28, 2020

(54) METHOD OF LOCATING A TRANSMITTING SOURCE IN MULTIPATH ENVIRONMENT AND SYSTEM THEREOF

(71) Applicant: Elta Systems Ltd., Ashdod (IL)

(72) Inventor: Daniel Avitzour, Jerusalem (IL)

(73) Assignee: Elta Systems Ltd., Ashdod (IL)

( * ) Notice: Subject to any disclaimer, the term of this patent is extended or adjusted under 35 U.S.C. 154(b) by 396 days.

(21) Appl. No.: 15/398,333

(22) Filed: Jan. 4, 2017

(65) Prior Publication Data

US 2017/0192083 A1 Jul. 6, 2017

(30) Foreign Application Priority Data

Jan. 5, 2016 (IL) .......................................... 243484
Jul. 4, 2016 (IL) .......................................... 246602

(51) Int. Cl.
*G01S 5/02* (2010.01)
*G01S 5/06* (2006.01)

(52) U.S. Cl.
CPC .......... *G01S 5/0215* (2013.01); *G01S 5/0278* (2013.01); *G01S 5/0273* (2013.01); *G01S 5/06* (2013.01)

(58) Field of Classification Search
CPC .... G01S 5/0273; G01S 5/0215; G01S 5/0221; G01S 5/0278; G01S 3/805
See application file for complete search history.

(56) References Cited

U.S. PATENT DOCUMENTS

| 5,045,860 A | 9/1991 | Hodson | |
|---|---|---|---|
| 6,268,829 B1 * | 7/2001 | Weckstrom | G01S 3/52 342/418 |
| 6,407,703 B1 * | 6/2002 | Minter | G01S 5/02 342/450 |

(Continued)

FOREIGN PATENT DOCUMENTS

| DE | 199 36 846 A1 | 4/2000 |
|---|---|---|
| WO | 97/22888 A1 | 6/1997 |

(Continued)

OTHER PUBLICATIONS

Bishop, Adrian et al. "Exploiting Geometry for Improved Hybrid AOA/TDOA-based Localization." ScienceDirect Signal Processing 88 (2008). pp. 1775-1791. (Year: 2008).*

(Continued)

*Primary Examiner* — Gregory C. Issing
(74) *Attorney, Agent, or Firm* — Mintz Levin Cohn Ferris Glovsky and Popeo, P.C.; Steven M. Jensen

(57) ABSTRACT

There are provided a method of locating a transmitting source in multipath environment and system thereof. The method comprises: obtaining, by each receiver k of a plurality of spatially separated receivers, a sequence of samples of a signal received by the receiver, each sample respectively associated with a time of obtaining said sample, wherein one or more receivers m among the plurality of receivers k each obtain a respective sequence of samples over a plurality of different positions along a respective trajectory r(t) with respect to the site associated with the respective receiver m; and processing the obtained sequences of samples to identify the most likely location of the transmitting source. Optionally, most likely location can be estimated using a grid of potential locations within an area of interest.

11 Claims, 6 Drawing Sheets

304

Obtaining data indicative of an area of interest divided into a grid of potential locations of the transmitter (501)

Processing sequences of samples to generate, for each receiver and for each potential location in the grid, data indicative of an estimated sequence of samples V(q) likely to be received by the receiver over a plurality of times based on line of sight propagation from the transmitting location (502)

For each given potential location in the grid, generating a corresponding matrix associating each receiver with the estimated sequence of samples generated for the receiver and for the corresponding location in the grid (503)

Comparing the matrices associated with different potential locations to identify the matrix corresponding to the potential location with the highest likelihood of real location of the transmitting source (504)

(56) References Cited

U.S. PATENT DOCUMENTS

| | | | | |
|---|---|---|---|---|
| 7,911,385 B2* | 3/2011 | Heuser | ............... | G01S 5/0273 |
| | | | | 342/450 |
| 8,077,091 B1 | 12/2011 | Guigne et al. | | |
| 8,188,923 B2* | 5/2012 | Ferreol | ............... | G01S 5/12 |
| | | | | 342/464 |
| 9,841,489 B2* | 12/2017 | Boker | ............... | G01S 5/06 |
| 2005/0105600 A1 | 5/2005 | Culum et al. | | |
| 2010/0138184 A1* | 6/2010 | Fernandez | ............... | G01S 5/02 |
| | | | | 702/150 |
| 2011/0273328 A1 | 11/2011 | Parker | | |
| 2012/0313820 A1* | 12/2012 | Tyree | ............... | G01S 5/0252 |
| | | | | 342/450 |
| 2015/0009072 A1* | 1/2015 | Nijsure | ............... | G01S 5/0215 |
| | | | | 342/417 |
| 2015/0301152 A1* | 10/2015 | Kumar | ............... | G01S 3/46 |
| | | | | 342/449 |

FOREIGN PATENT DOCUMENTS

| | | | |
|---|---|---|---|
| WO | 2011/160698 A1 | 12/2011 | |
| WO | 2015/001552 A1 | 1/2015 | |

OTHER PUBLICATIONS

Norouzi et al., "Joint time difference of arrival/angle of arrival position finding in passive radar," IET Radar Sonar Navig., vol. 3, No. 2, 2009, pp. 167-176.

* cited by examiner

304

Determining, for at least one pair of receivers $K$, each pair including at least one receiver $M$, estimates for i) a time difference of arrival of the received direct path signal with respect to the at least one pair of receivers, and ii) an angle of arrival of the received direct path signal in respect of at least one receiver $M$ in the pair of receivers, thereby giving rise to measurement data, wherein the measurement data is determined based on maximizing an objective function (401)

Using the measurement data to identify the most likely location of the transmitting source (402)

Figure 4

METHOD OF LOCATING A TRANSMITTING SOURCE IN MULTIPATH ENVIRONMENT AND SYSTEM THEREOF

CROSS-REFERENCES TO RELATED APPLICATIONS

The present application claims benefit from Israel Application No. 243484 filed on Jan. 5, 2016 and Israel Application No. 246602 filed on Jul. 4, 2016; both applications incorporated hereby by reference in their entirety.

TECHNICAL FIELD

The presently disclosed subject matter relates to location of a transmitting source and, more particularly, to location of a transmitting source in a multipath environment.

BACKGROUND

In order to determine a location of a transmitting source, location techniques use the measurements obtained by a plurality of receivers. The obtained measurement data are informative of intensity (signal strength) and/or the phase and/or delay of the transmitted signal, and can be used for estimating distance to the transmitting source in accordance with received signal strength (RSS), time of arrival (TOA) at the receivers, angle of arrival (AOA) of the transmitted signal, time difference of arrival (TDOA) at the receivers, etc.

The location techniques (e.g. radio frequency location) are well-known when assuming free-space propagation, however multipath interference makes the location estimation process to become challenging. Multipath is characterized by multiple reflections, while reflections power and the reflections delays dependent on the nature of the environment.

Problems of mitigating the effects of multipath propagation in location of a transmitting source have been recognized in the conventional art and various techniques have been developed to provide solutions, for example:

U.S. Pat. No. 8,077,091 (Guigne) discloses a method of determining a position of a mobile device within a surveillance volume. The method comprises synchronizing communications between a phase difference array comprising a spatially diverse array of N sensors and the mobile device, N being greater than 4; acquiring phase difference data as a function of time using the phase difference array and determining phase differences for a plurality of receiver pairs defined for the phase difference array, each receiver pair consisting of a unique pair of the sensors in the spatially diverse array of N sensors; and determining the position of the mobile device from the phase differences.

U.S. Patent Application No. 2011/0273328 (Parker) discloses a method of geolocating a moving transmitter observed by a plurality of fixed or nearly fixed receiver devices, and a moving receiver device. The method includes obtaining wavelength-scaled phase difference measurements from the plurality of fixed or nearly fixed receiver devices to obtain a shape of the transmitter trajectory, measuring the phase difference between the moving receiver device and at least one of the plurality of fixed or nearly fixed receiver devices to obtain a phase error residual, and moving an estimated starting point of the transmitter to obtain a best-fit residual.

International Patent Application No. WO15/001552A1 (Boker) discloses a method and system for radiolocation of RF transmitter in the presence of multipath interference. RF receivers are spatially separated at known locations in a moderate multipath environment in the vicinity of the transmitter. Upon detection of a received active RF signal associated with the transmitter, the receivers are directed to acquire measurements of the detected RF signal. Each receiver obtains a sequence of measurements of the RF signal at different positions along a trajectory that provides multiple measurements at relative phase differences between the direct-path and the multipath reflections of the detected RF signal. The receivers may be repositioned automatically or manually, or prearranged or selectively deployed at fixed positions along the trajectory. TDOA measurements between pairs of receivers are calculated based on the obtained measurements, and are averaged to provide a respective updated TDOA measurement value for each receiver pair, which is used to determine the transmitter location.

The references cited above teach background information that may be applicable to the presently disclosed subject matter. Therefore the full contents of these publications are incorporated by reference herein where appropriate for appropriate teachings of additional or alternative details, features and/or technical background.

GENERAL DESCRIPTION

According to one aspect of the presently disclosed subject matter, there is provided a system for locating a transmitting source in a multipath environment, comprising a plurality of spatially separated receivers K, each receiver K configured to obtain a sequence of samples of a signal received by the receiver, each sample respectively associated with a time of obtaining said sample, wherein one or more receivers M among the plurality of receivers K are each configured to obtain a respective sequence of samples over a plurality of different positions along a respective trajectory r(t) with respect to the site associated with the respective receiver M; and a processor and memory module operatively connected to the plurality of spatially separated receivers K and configured to process the sequences of samples obtained by the plurality of spatially separated receivers K to identify the most likely location of the transmitting source.

In addition to the above features, the system according to this aspect of the presently disclosed subject matter can comprise one or more of features (i) to (x) listed below, in any desired combination or permutation which is technically possible:

(i) the processing to identify the most likely location is based on estimating, with respect to at least one pair of receivers, the pair including at least one receiver M: i) a time difference of arrival of the received direct path signal in respect of the receivers in the pair of receivers, and ii) an angle of arrival of the received direct path signal in respect of each receiver M in the pair of receivers;

(ii) the time difference of arrival $D_{ki}$ in respect of a pair of receivers constituted by a k-th receiver and a i-th receiver, and at least one angle of arrival $\alpha_k$ in respect of the k-th receiver, are estimated by maximizing an objective function $J(D_{ki}, \alpha_k)$ over $D_{ki}, \alpha_k$, wherein at least the k-th receiver is a receiver M;

(iii) the k-th receiver and the i-th are each a receiver M, and wherein $D_{ki}, \alpha_k$ and the angle of arrival $\alpha_i$ in respect of the i-th receiver are estimated by maximizing an objective function $J(D_{ki}, \alpha_k, \alpha_i)$ over $D_{ki}, \alpha_k, \alpha_i$;

(iv) the objective function is $$J(D_{ki},\alpha_k,\alpha_i)=|\int z_k(t)^*z_i(t+D_{ki})\exp(-2\pi j(r_k(t)^T(u(\alpha_k)-r_i(t)^Tu(\alpha_i))/\lambda)dt|$$

where $z_k(t)$ denotes the sequence of samples obtained by the k-th receiver, $z_i(t)$ denotes the sequence of samples obtained by the i-th receiver, "*" denotes the complex conjugate, T denotes the transposed vector, $u(\alpha)$ denotes a unit vector in direction $\alpha$, and $\lambda$ denotes the wavelength corresponding to the frequency of the source signal;

(v) the estimates for $D_{ki}$, $\alpha_k$, and $\alpha_i$ are used to identify the most likely location of the transmitting source by minimization over a location space of an objective function expressing weighted square errors for each of a plurality of candidate locations;

(vi) the most likely location is estimated using a grid of potential locations within an area of interest;

(vii) said processing includes: obtaining data indicative of an area of interest divided into a grid of potential locations of the transmitting source; processing the sequences of samples to generate, for each receiver and for each potential location in the grid, data indicative of an estimated sequence of samples likely to be received the receiver over a plurality of times based on line of sight propagation of a signal transmitted from the potential location; generating, for each given potential location in the grid, a matrix corresponding to the given potential location and associating each receiver with the estimated sequence of samples generated for the receiver for the corresponding location in the grid; and comparing the matrices corresponding to different potential locations to identify the matrix corresponding to potential location with the highest likelihood of real location of the transmitting source;

(viii) the estimated sequence of samples $V_{kt}(q)$ generated for a k-th receiver for a potential location q is calculated as:

$$V_{kt}(q)=z_k(t-D_k(q))\exp(-j\theta_q), \text{ where } \theta_q=2\pi r_k(t)^T{}^*u_k(q)/\lambda$$

where k ranges over 1 ... N (N being the number of sites), $z_k(t)$ is the sequence of samples obtained by the k-th receiver, $u_k(q)$ is a unit vector from the k-th receiver site to q, and $D_k(q)$ is the propagation time from q to the k-th receiver site;

(ix) comparing the matrices corresponding to different potential locations comprises calculating the norm of each matrix, wherein the potential location q corresponding to the matrix having the highest norm is identified as the potential location with the highest likelihood of real location of the transmitting source; and (x) at least one receiver M obtains a respective sequence of samples over a plurality of different positions along a trajectory using a moving antenna.

According to another aspect of the presently disclosed subject matter, there is provided a method of locating a transmitting source in a multipath environment, the method comprising: obtaining, by each receiver K of a plurality of spatially separated receivers, a sequence of samples of a signal received by the receiver, each sample respectively associated with a time of obtaining said sample, wherein one or more receivers M among the plurality of receivers K each obtain a respective sequence of samples over a plurality of different positions along a respective trajectory r(t) with respect to the site associated with the respective receiver M; and processing the obtained sequences of samples to identify the most likely location of the transmitting source.

This aspect of the disclosed subject matter can comprise one or more of features (i) to (x) listed above with respect to the system, mutatis mutandis, in any desired combination or permutation which is technically possible.

According to another aspect of the presently disclosed subject matter, there is provided a computer program product comprising a program of instructions readable by a computer, the program of instructions for executing a method of locating a transmitting source in a multipath environment, the method comprising: obtaining, by each receiver K of a plurality of spatially separated receivers, a sequence of samples of a signal received by the receiver, each sample respectively associated with a time of obtaining said sample, wherein one or more receivers M among the plurality of receivers K each obtain a respective sequence of samples over a plurality of different positions along a respective trajectory r(t) with respect to the site associated with the respective receiver M; and processing the obtained sequences of samples to identify the most likely location of the transmitting source.

This aspect of the disclosed subject matter can comprise one or more of features (i) to (x) listed above with respect to the system, mutatis mutandis, in any desired combination or permutation which is technically possible.

According to another aspect of the presently disclosed subject matter there is provided a non-transitory program storage device readable by a computer, tangibly embodying computer readable instructions executable by the computer to perform a method of locating a transmitting source in a multipath environment, the method comprising: obtaining, by each receiver K of a plurality of spatially separated receivers, a sequence of samples of a signal received by the receiver, each sample respectively associated with a time of obtaining said sample, wherein one or more receivers M among the plurality of receivers K each obtain a respective sequence of samples over a plurality of different positions along a respective trajectory r(t) with respect to the site associated with the respective receiver M; and processing the obtained sequences of samples to identify the most likely location of the transmitting source.

This aspect of the disclosed subject matter can comprise one or more of features (i) to (x) listed above with respect to the system, mutatis mutandis, in any desired combination or permutation which is technically possible.

Among advantages of certain embodiments of the presently disclosed subject matter is capability of locating a transmitting source with no need for antenna arrays at the sites. Among further advantages of certain embodiments of the presently disclosed subject matter is capability of locating a transmitting source with no need for synchronizing the samples provided by receivers at different sites.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 4 illustrates a generalized flow-chart of identifying the most likely location of a transmitter in accordance with a first embodiment of the presently disclosed subject matter;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "calculating", "determining", "comparing", "generating", "estimating", "identifying", "obtaining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, one or more components of radiolocation system disclosed in the present application.

The terms "non-transitory memory" and "non-transitory storage medium" as used herein should be expansively construed to cover any volatile or non-volatile computer memory suitable to the presently disclosed subject matter.

The term "location" should be expansively construed to cover any data indicative of a position of a respective object with respect to a relevant reference system.

The operations in accordance with the teachings herein may be performed by a computer specially constructed for the desired purposes or by a general-purpose computer specially configured for the desired purpose by a computer program stored in a non-transitory computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
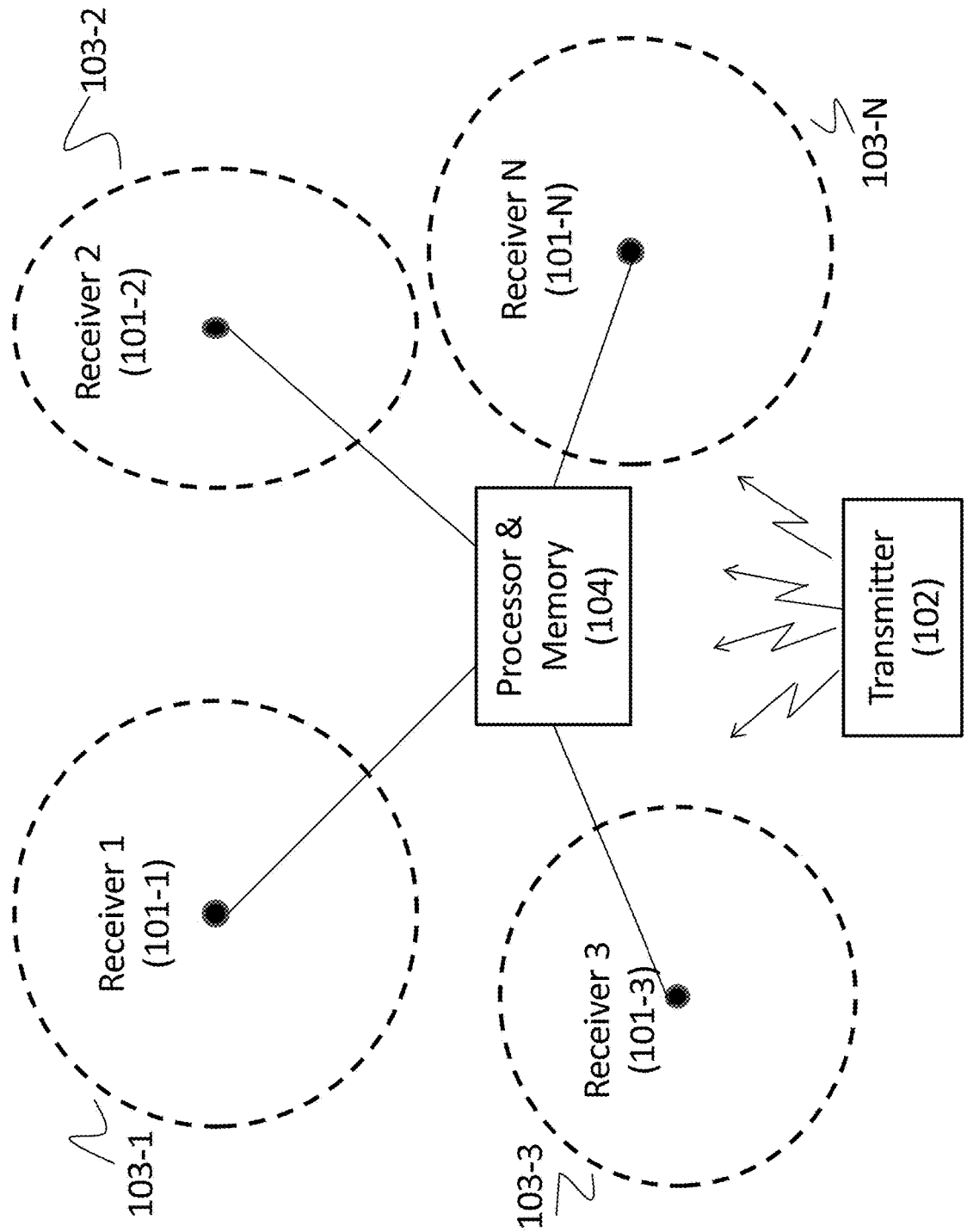
FIG. 1 illustrates a functional block diagram of a location system in accordance with certain embodiments of the presently disclosed subject matter.

Bearing this in mind, attention is drawn to FIG. 1 illustrating a functional diagram of a location system (LS) in accordance with certain embodiments of the presently disclosed subject matter. The illustrated system comprises a plurality of spatially separated hardware-based receivers (denoted 101-1-101-N) operatively connected to the processor and memory module (104).

The LS is configured to determine the location of a transmitter (102) (referred to hereinafter also as a "source") in the presence of moderate multipath interference (i.e. the received direct-path signal is stronger than the multipath reflections). Transmitter (102) is substantially stationary during the radiolocation process, and transmits a modulated, radio frequency (RF) signal throughout the radiolocation process.

Receivers (101-1)-(101-N) are situated at separate sites, each within the reception range the signal transmission from transmitter (102). The operative bandwidth of each receiver (101-1)-(101-N) corresponds to the operative bandwidth of the transmitter (102). In certain embodiments, LS includes at least N receivers located at N different sites, where N≥2. In certain embodiments, the different receiver sites can be positioned with respect to one another in a manner that provides advantageous geometry for locating a transmitter, e.g. by ensuring a large variance in the different directions to the transmitter.

Receivers (101-1)-(101-N) are configured to enable movable sampling of a signal over a respective trajectory r(t), denoted (103-1)-(103-N), with respect to the site of the receiver. In certain embodiments, at least one of receivers (101-1)-(101-N) is configured to enable movable sampling of a signal over a respective trajectory, while the other receivers may not be configured to enable movable sampling. Trajectories can be circular, e.g. with typical trajectory diameter in the order of the wavelength of the signal, or can be represented by other shapes or patterns. The trajectory shapes can be different for different receivers. For purpose of illustration only, the description is provided for substantially circular trajectories having minimal diameter equal to the wavelength of the transmitted signal. Such trajectories can enable a large span of reflection delays regardless of the constellation of the transmitter and the receivers. Those skilled in the art will readily appreciate that the teachings of the presently disclosed subject matter are, likewise, applicable to other trajectory shapes and/or sampling patterns enabling a sampled diversity of phase differences between the direct-path and reflection signals.

Each of the receivers is configured to obtain a sequence of samples of a signal (also referred to as "sampling") having a given frequency, at a fixed sampling rate for the duration of a predetermined sampling period, each sample associated with a time of obtaining the sample ("time-tagged"), and to provide the sequence of samples to the processor and memory module (104). Receivers configured for moveable sampling along a trajectory obtain the samples of the signal at different positions along the receiver's trajectory. Each receiver configured to enable moveable sampling can perform moveable sampling independently from the moveable sampling performed by other receivers. The measuring pattern(s) shall enable a required distribution of respective phase differences (e.g. over the range of 0 to 360 degrees) between the direct path and the multipath signals, thereby reducing the bias created by multipath. For a given receiver, the measuring positions along its trajectory can be distributed over its respective trajectory evenly or non-evenly. The subject matter does not limit the number of measurements taken during a sampling period, however the rate of sampling should be at least equal to the Nyquist rate. The number of measurements taken per receiver may or may not be the same for all receivers.

In certain embodiments of the presently disclosed subject matter, one or more receivers can sample the signal repeatedly over a plurality of trajectory cycles during the sampling period.

In certain embodiments, a receiver configured for moveable measuring can include one or more moveable antennas. The spatial diversity created by antenna motion reduces the bias created by multipath. This effect can be significant when the antenna moves over a large distance and the angle difference between direct reception and secondary path is large. For purpose of illustration only, the description is provided for substantially static receivers with movable sampling enabled by a moving antenna. Those skilled in the art will readily appreciate that the teachings of the presently disclosed subject matter are, likewise, applicable to movable measuring enabled by other means, e.g. by physical reposition of respective receivers and/or selectable switching of prearranged or selectively deployed sub-receivers (or antennas) along a trajectory, etc. Physical reposition of respective receivers can be achieved, e.g., by using an automatic mechanical device, such as a rotating device that moves the receiver along the trajectory, by coupling the receiver to a mobile platform such as being mounted onto a vehicle or onto a robotic trolley, by movement of a person manually transporting the receiver, etc.

The rate at which the antenna moves should be sufficient to allow sufficient coverage of relative phase difference between direct path and reflection signals (e.g. during a single traversal of the trajectory or over a plurality of traversals). For another example, each sub-receiver or antenna prearranged or selectively deployed at a fixed point along the trajectory can be switched to take one of the measurements. In this example or in other examples with sub-receivers, the sub-receivers can collectively function as a receiver that employs movable measuring. For another example, for each trajectory a different sub-receiver or antenna can be concurrently repositioned along each part of the trajectory and take measurements along that part (e.g. one sub-receiver can take measurements along half of the trajectory and during the same time period the other sub-receiver can take measurements along the other half of the trajectory). In this example, the number of measurements can be increased for the time period. For another example, if there are two or more transmitters, operating in different frequency ranges, then for each transmitter there can be a set of receivers that can be repositioned in order to detect the signal emitted from the transmitter. The repositioning of the various receivers corresponding to the plurality of transmitters can be performed by one or more mechanisms such as rotating device(s). In this example the mechanism can rotate at least one receiver in a set, together or separately, along the same of different trajectory.

Processor & memory module (104) is configured, inter alia, to receive the sequences of samples obtained by the plurality of receivers and to process the sequences of samples to identify the most likely location of the transmitter, as will further be detailed with reference to FIGS. 3-5. In certain embodiments, processor & memory module (104) can also be configured to control the operation of receivers (101-1)-(101-N) (e.g. to enable synchronization of the receivers' clocks, to provide selectable switching if necessary, etc.). In certain embodiments, one or more of the receivers can, at least partly process the sequence of samples obtained by the receiver, and to transfer the resulting data to the processor & memory module (104) for further processing to identify the most likely location of the transmitter.

Figure 2:
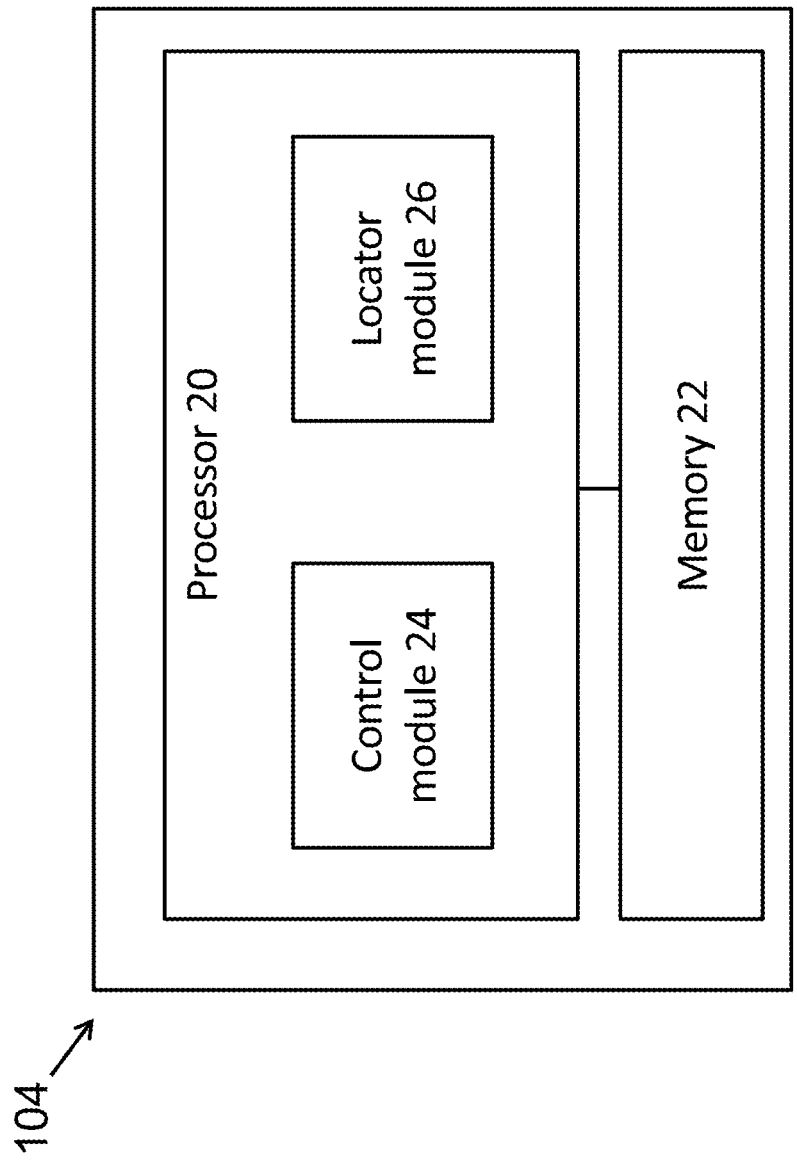
FIG. 2 illustrates a functional block diagram of a processor and memory module in accordance with certain embodiments of the presently disclosed subject matter.

FIG. 2 illustrates a functional diagram of the processor and memory module (104) in accordance with certain embodiments of the disclosed subject matter. In certain embodiments, processor & memory module (104) comprises a processor (20) operatively coupled to a memory (22).

As will be further detailed with reference to FIGS. 3-5, the processor (20) can be configured to execute several functional modules in accordance with computer-readable instructions implemented on a non-transitory computer-readable storage medium. Such functional modules are referred to hereinafter as comprised in the processor. In certain embodiments, the processor can comprise a control module (24) configured to control the operation of receivers (101-1)-(101-N) (e.g. by instructing the receivers to begin and/or end sampling, enabling synchronization of the measurement duration and/or the separate receiver's clocks, providing selectable switching if necessary, etc.). The processor can further comprise a locator module (26) configured to perform processing for locating a source based on the measurements provided by the receivers and/or data resulted therefrom, as will be detailed below with reference to FIGS. 3-5.

Memory (22) can include transitory or non-transitory memory and can be configured to store, inter alia, samples and/or data resulted therefrom for processing by the processor (20).

For purpose of illustration only, the description is provided for substantially circular trajectories with typical diameter equal to the wavelength of the transmitted signal. Such trajectories can enable a uniform span of reflection delays regardless of the constellation of the transmitter and the receivers. Those skilled in the art will readily appreciate that the teachings of the presently disclosed subject matter are, likewise, applicable to other trajectory shapes and/or sampling patterns enabling a sampled diversity of phase differences between the direct-path and reflection signals.

For purpose of illustration only, the description is provided for substantially static receivers with movable sampling enabled by a moving antenna. Those skilled in the art will readily appreciate that the teachings of the presently disclosed subject matter are, likewise, applicable to movable measuring enabled by physical reposition of respective receivers, selectable switching of prearranged sub-receivers along a trajectory, etc.

It is noted that the teachings of the presently disclosed subject matter are not bound by the location system described with reference to FIGS. 1-2. Equivalent and/or modified functionality can be consolidated or divided in another manner and can be implemented in any appropriate combination of software, firmware and/or hardware and executed on a suitable device. The location system can be a standalone network entity, or integrated, fully or partly, with other network entities.

Figure 3:
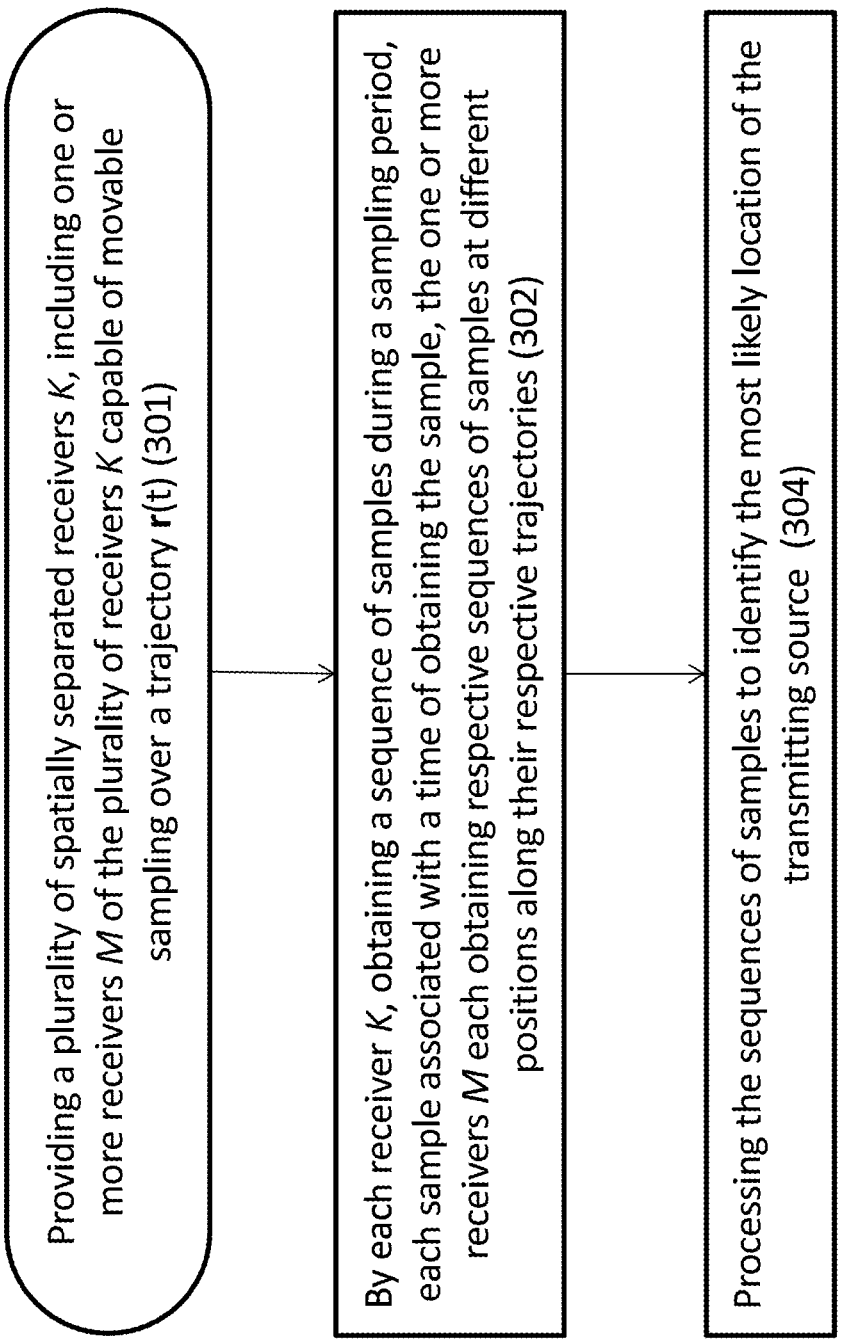
FIG. 3 illustrates a generalized flow-chart of locating a transmitter in accordance with certain embodiments of the presently disclosed subject matter.

FIG. 3 illustrates a generalized flow chart of locating a source in accordance with certain embodiments of the presently disclosed subject matter.

The LS is configured (301) to provide a plurality of spatially separated receivers K, the plurality of receivers K including one or more receivers M capable of movable sampling of a signal over a respective trajectory r(t) with respect to the site of the respective receiver's M location. In certain embodiments, as detailed above with reference to FIG. 1, each receiver K is capable of movable sampling of a signal over a respective trajectory.

Each receiver K obtains (302) a sequence of samples of a given signal (e.g. a signal having a given frequency) during a sampling period, each sample associated with a time of obtaining the sample. The one or more receivers M of the plurality of receivers K each obtain respective sequences of samples at different positions along their respective trajectories. In certain embodiments, as detailed above, each receiver of the plurality of receivers K is configured for moveable sampling along a trajectory (i.e. each receiver K is also a receiver M), and obtains samples of the signal at different positions along its respective trajectory.

In certain embodiments, the plurality of receivers can each obtain a respective sequence of samples $z(t)$ in response to receiving data from the processor and memory module (104) indicative of an instruction to sample a signal. In certain embodiments, the data received from the processor and memory module (104) can include, e.g., a particular frequency to sample. The data indicative of an instruction can be generated by the processor and memory module (104), e.g., control module (24), and transmitted to the plurality of receivers.

In certain other embodiments, each receiver can, in coordination with every other receiver, cycle through a predefined list of frequencies, each iteration of the cycle corresponding to a given frequency in the list. In any given iteration, each receiver can obtain a sequence of samples of the signal having the frequency corresponding to the given iteration. After a predetermined period of time (e.g. the sampling period), each receiver can automatically move to the next iteration of the cycle whereby each receiver obtains samples of a signal having the next frequency in predefined list of frequencies. In any given iteration, if no signal having the given frequency is detected by a receiver, no samples are obtained and the receiver moves to the next iteration after expiry of the predetermined period of time.

In the description that follows, the sequence of samples obtained by the k-th receiver is denoted $z_k(t)$. As will be appreciated a person skilled in the art, the sequence of samples $z_k(t)$ corresponding to a source signal $s(t)$ transmitted at a frequency corresponding to wavelength $\lambda$ and located at direction $\alpha$ from the site of the k-th receiver can be represented mathematically as $$z_k(t)=A_k s(t+D_k)\exp(j\theta_k)+w_k(t) \quad (1)$$

where $A_k$ is respective amplitude, $D_k$, is the propagation delay from the source to the k-th site, $w_k(t)$ is additive white Gaussian noise (AWGN), j is $\sqrt{(-1)}$, and $\theta_k$ is phase offset between reception at the receiver site and reception at the transmitter site, where $$\theta_k=2\pi r_k(t)^T u(\alpha_k)/\lambda \quad (2)$$

where T denotes transposed vector, $r_k(t)$ is the location of the k-th receiver's antenna at a time t, and $u(\alpha_k)$ is a unit vector in direction $\alpha$.

It will further be appreciated by a person skilled in the art that in the case that the k-th receiver is a receiver M configured for moveable sampling along a trajectory, the sequence of samples $z_k(t)$ obtained by k-th receiver can be used to determine (e.g. by solving a series of non-linear equations, etc.) the propagation delay of the signal and an angle of arrival of the signal. As will be further detailed herein with reference to FIGS. 4-5, given a pair of receivers k, i, at least one of which is a receiver M, the sequences of samples obtained by the pair of receivers can be used to estimate the propagation delay and/or angle of arrival of the direct path signal in the presence of multipath reflections, and thereby to identify the most likely location of the transmitter.

In certain embodiments, the sequences of samples of a given signal respectively obtained by the plurality of receivers are provided to the processor and memory module (104). Processor and memory module (104), e.g. locator module (26), processes the sequences of samples obtained by the plurality of receivers to identify (304) the most likely location of the transmitting source, as will further be detailed below with reference to FIG. 4 illustrating a flow chart of identifying the most likely location of the transmitting source in accordance with a first embodiment, and with reference to FIG. 5 illustrating a flow chart of identifying the most likely location of the transmitting source in accordance with a second embodiment.

In accordance with a first embodiment, the most likely location can be estimated based on a time difference of arrival D of the signal in respect of one or more pairs of receivers K, the pair of receivers including at least one receiver M, and at least one angle of arrival $\alpha$ of the signal in respect of the at least one receiver M in the pair of receivers.

Referring now to FIG. 4, there is illustrated a flow chart of identifying the most likely location in accordance with the first embodiment of the disclosed subject matter.

Processor and memory module (104), e.g. locator module (26), determines (401), for at least one pair of receivers K, each pair including at least one receiver M, estimates for: i) a time difference of arrival of the received direct path signal with respect to the at least one pair of receivers, and ii) an angle of arrival of the received direct path signal in respect of at least one receiver M in the pair of receivers, thereby giving rise to measurement data.

In certain embodiments, determining the measurement data can be based on maximizing an objective function. By way of non-limiting example, given one or more pairs of receivers k and i, in which both k and i are receivers M (i.e. configured for moveable sampling), the time difference of arrival of the signal in respect of the pair of receivers is indicated by the parameter $D_{ki}$, the angle of arrival in respect of receiver k is indicated by the parameter $\alpha_k$, and the angle of arrival of the signal in respect of receiver i is indicated by the parameter $\alpha_i$. Processor and memory module (104) can determine the values for the parameters $D_{ki}$, $\alpha_k$ and $\alpha_i$ that maximize an objective function $J(D_{ki}, \alpha_k, \alpha_i)$ over $D_{ki}$, $\alpha_k$, $\alpha_i$. By way of non-limiting example, the objective function can be represented as $$J(D_{ki},\alpha_k,\alpha_i)=|\int z_k(t)^* z_i(t+D_{ki})\exp(-2\pi j(r_k(t)^T(u(\alpha_k)-r_i(t)^T u(\alpha_i))/\lambda)dt| \quad (3)$$

where "*" is used to indicate the complex conjugate, $z_k(t)$ is the sequence of samples obtained by receiver k, and $z_i(t)$ is the sequence of samples obtained by receiver i.

By way of a further non-limiting example, in the case that in the pair of receiver k, i, only receiver i is a receiver M (i.e. configured for moveable sampling) and receiver k is not a receiver M (i.e. $r_k(t)=0$) processor and memory module (104) can determine values for the parameters $D_{ki}$, $\alpha_i$ that maximize an objective function $J(D_{ki}, \alpha_i)$ over $D_{ki}$, $\alpha_i$. By way of non-limiting example, the objective function can be represented as $$J(D_{ki},\alpha_i)=|\int z_k(t)^* z_i(t+D_{ki})\exp(-2\pi j(-r_i(t)^T u(\alpha_i))/\lambda)dt| \quad (4)$$

where "*" is used to indicate the complex conjugate, $z_k(t)$ is the sequence of samples obtained by receiver k, and $z_i(t)$ is the sequence of samples obtained by receiver i.

Using the measurement data, processor and memory module (104), e.g. locator module (26), identifies (402) the most likely location of the transmitter. For example, as known in the art of radiolocation, given estimated values for the time difference of arrival (DTOA) in respect of pairs of sensors $s_k$, $s_l$, where k, l=1 . . . N, k≠l, and given at least one estimated angle of arrival (AOA) in respect of at least $s_k$, the location of the transmitter can be determined by minimization over a location space of an objective function expressing weighted squared errors for each candidate location x, the objective function represented as:

$$J(x)=\Sigma(\text{dist}(x,s_k)-\text{dist}(x,s_l)-c\text{DTOA}_{kl})^2/\sigma_{DTOA}^2 + (\text{angle}(x,s_k)-\text{AOA}_k)^2/\sigma_{AOA}^2 \quad (5)$$

where c is the speed of light, $\sigma_{DTOA}^2$ and $\sigma_{AOA}^2$ are the estimation error variances of DTOA and AOA, respectively, and dist(x, s) and angle(x, s) are the geometric distance and angle, respectively, between location x and the sensor.

In accordance with a second embodiment of the disclosed subject matter, the most likely location of the transmitting source can be estimated using a grid of potential locations within an area of interest.

Figure 5:
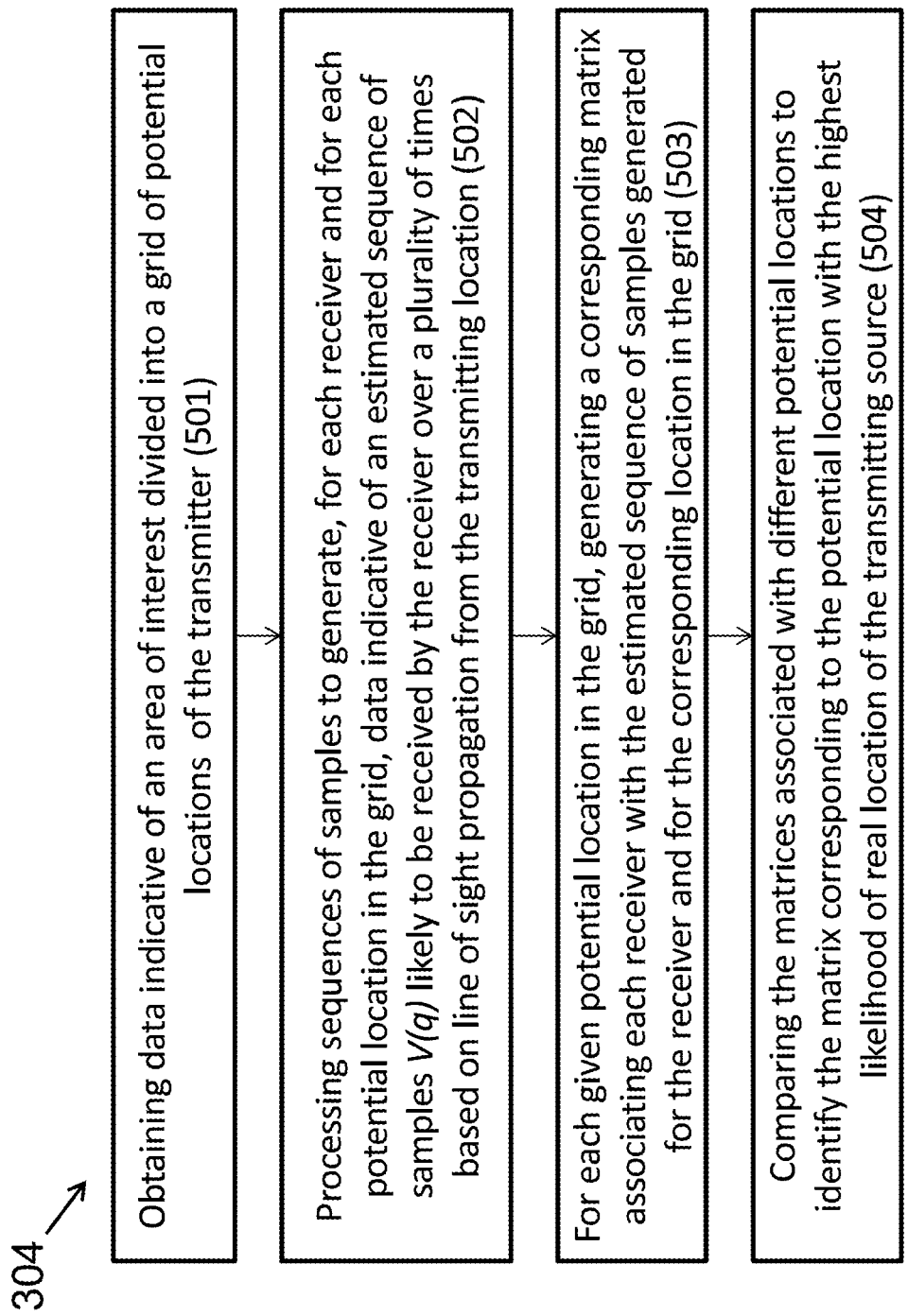
FIG. 5 illustrates a generalized flow-chart of identifying the most likely location of a transmitter in accordance with a second embodiment of the presently disclosed subject matter.

Referring now to FIG. 5, there is illustrated a flow chart of identifying the most likely location in accordance with the second embodiment of the disclosed subject matter. Processor and memory module (104) obtains (501), e.g. from memory (22), data indicative of a geographical area of interest divided into a grid of potential locations of the transmitter. In certain embodiments, the LS can be preconfigured with the data.

Processor and memory module (104), e.g. locator module (26), processes the sequences of samples obtained by the plurality of receivers K to generate (502), for each receiver among the plurality of receivers K, and for each potential transmitter location q in the grid of potential locations, data indicative of an estimated sequence of samples V(q) likely to be received by the receiver over a plurality of times, the estimated sequence of samples based on line of sight propagation from a transmitting source located at location q. In certain embodiments, the plurality of times in respect of the estimated sequence of samples for a given receiver corresponds to the plurality of times associated with the samples obtained by the given receiver. In certain embodiments, an estimated sequence of samples for a given receiver can be generated by modifying one or more samples of the sequence of samples actually obtained by the receiver. Such modifications may be made, for example, based on the distance and direction from the receiver to the potential location q.

By way of non-limiting example, the estimated sequence of samples V(q) generated for each receiver corresponding to a given location q can be represented as:

$$V_{k_t}(q) = z_k(t - D_k(q)) \exp(-j\theta_q), \theta_q = 2\pi r_k(t)^T * u_k(q)/\lambda \quad (6)$$

where k ranges over 1 ... N (N being the number of sites), $z_k(t)$ is the sequence of samples obtained by the k-th receiver, $u_k(q)$ is a unit vector from the k-th receiver site to q, and $D_k(q)$ is the propagation time from q to the k-th receiver site.

Figure 6:
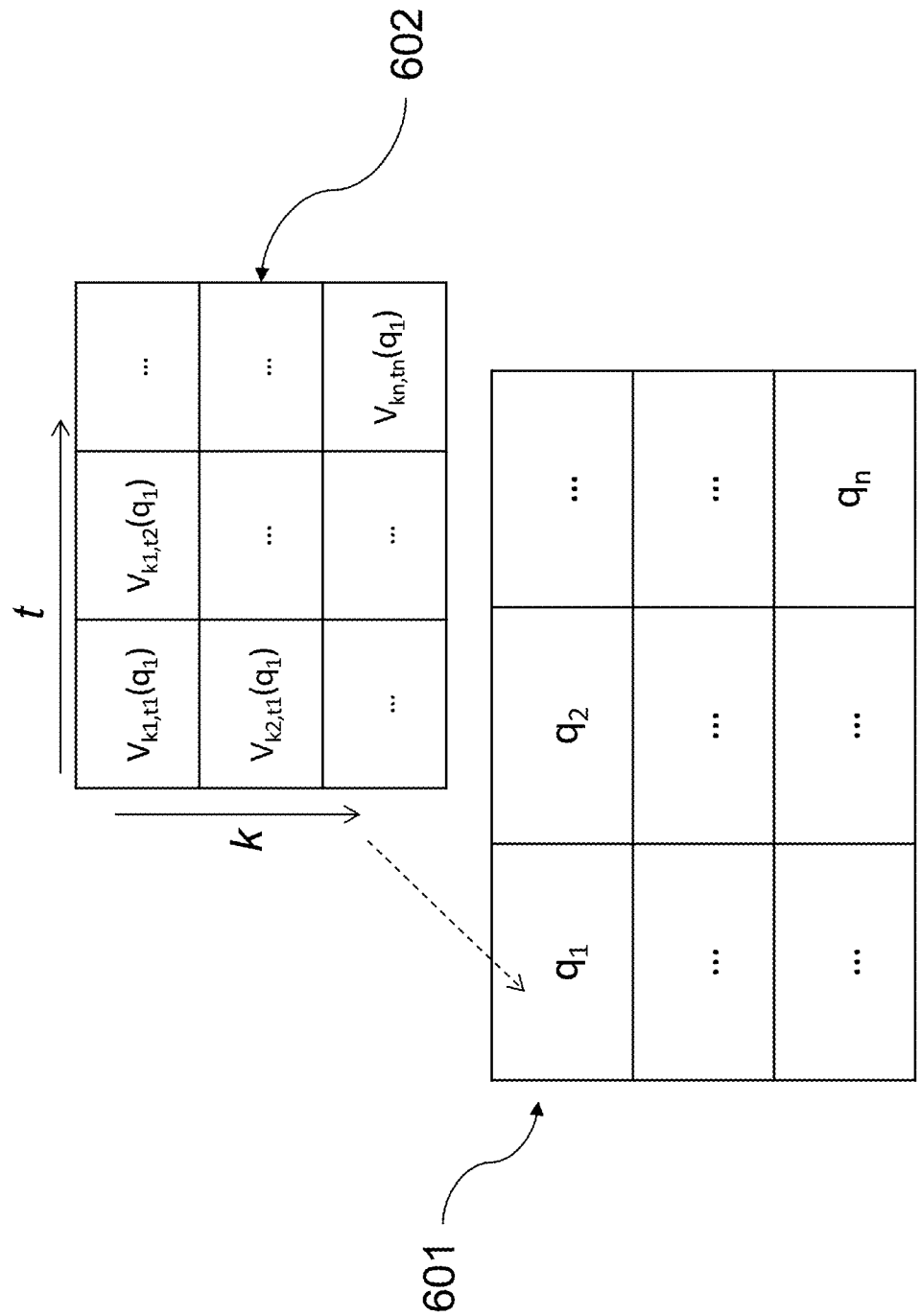
FIG. 6 illustrates a grid of potential locations of the transmitter, in accordance with certain embodiments of the presently disclosed subject matter.

Processor and memory module (104), e.g. locator module (26), further generates (503), for each given potential location of transmitter in the grid, a matrix associating each receiver among the plurality of receivers K with the estimated sequence of samples generated for the receiver and corresponding to the given location, as illustrated by way of example in FIG. 6, showing each location q in the grid (601) of potential locations being associated with a matrix (602), the matrix (602) associating each receiver in the plurality of receivers with each of a plurality of samples taken over a respective plurality of times.

Processor and memory module (104), e.g. locator module (26), compares (504) the matrices associated with different potential locations to identify the matrix corresponding to the potential location with the highest likelihood of real location of the transmitting source. In certain embodiments, comparing matrices includes calculating the norm of each matrix, and comparing the norms of each respective matrix.

By way of non-limiting example, the norm of each matrix can be determined by maximizing $$\|V(q)V(q)^H\| \quad (7)$$

where H indicates a Hermitian transpose. It should be noted that the matrix inside the norm symbol is N×N.

The grid location associated with the matrix having highest norm is then identified as the potential location with the highest likelihood of real location of the transmitting source.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be implemented, at least partly, a suitably programmed computer. Likewise, the invention contemplates a computer program being readable by a computer for executing the method of the invention. The invention further contemplates a non-transitory machine-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of locating a transmitting source in a multipath environment, the method comprising:
   obtaining, by each receiver K of a plurality of spatially separated receivers, a sequence of samples of a signal transmitted by the transmitting source and received by the receiver, each sample respectively associated with a time of obtaining said sample, wherein one or more receivers M among the plurality of receivers K each obtain a respective sequence of samples over a plurality of different positions along a respective trajectory r(t) with respect to the site associated with the respective receiver M; and
   processing the obtained sequences of samples to identify the most likely location of the transmitting source,
   wherein said processing includes:
      obtaining data indicative of an area of interest divided into a grid of potential locations of the transmitting source;
      modifying the sequences of samples to generate, for each receiver and for each potential location in the grid, data indicative of an estimated sequence of samples likely to be received by the receiver over a plurality of times, the modifying based on a distance and a direction from the receiver to the potential location and a corresponding line of sight propagation of a signal transmitted from the potential location;
      generating, for each given potential location in the grid, a matrix corresponding to the given potential location and associating each receiver with the estimated sequence of samples generated for the receiver for the corresponding location in the grid; and
      comparing the matrices corresponding to different potential locations to identify the matrix corresponding to potential location with the highest likelihood of real location of the transmitting source.

2. The method of claim 1, wherein the estimated sequence of samples Vkt(q) generated for a k-th receiver for a potential location q is calculated as:

$$Vkt(q)=zk(t-Dk(q))\exp(-j\theta q), \text{ where } \theta q=2\pi rk(t)T^*uk(q)/\lambda$$

where k ranges over 1 ... N (N being the number of sites), zk(t) is the sequence of samples obtained by the k-th receiver, uk(q) is a unit vector from the k-th receiver site to q, and Dk(q) is the propagation time from q to the k-th receiver site.

3. The method of claim 1, wherein comparing the matrices corresponding to different potential locations comprises calculating the norm of each matrix, wherein the potential location q corresponding to the matrix having the highest norm is identified as the potential location with the highest likelihood of real location of the transmitting source.

4. The method of claim 1, wherein at least one receiver M obtains a respective sequence of samples over a plurality of different positions along a trajectory using a moving antenna.

5. The method of claim 1, wherein obtaining by the at least one receiver M the sequence of samples over the plurality of different receiving positions along the trajectory comprises physical repositioning of the at least one receiver M.

6. A system for locating a transmitting source in a multipath environment, comprising:
  a plurality of spatially separated receivers K, each receiver K configured to obtain a sequence of samples of a signal transmitted by the transmitting source and received by the receiver, each sample respectively associated with a time of obtaining said sample, wherein one or more receivers M among the plurality of receivers K are each configured to obtain a respective sequence of samples over a plurality of different positions along a respective trajectory r(t) with respect to the site associated with the respective receiver M; and
  a processor and memory module operatively connected to the plurality of spatially separated receivers K and configured to process the sequences of samples obtained by the plurality of spatially separated receivers K to identify the most likely location of the transmitting source,
  wherein the processor and memory module is configured to:
  obtain data indicative of an area of interest divided into a grid of potential locations of the transmitting source;
  modify the sequences of samples to generate, for each receiver and for each potential location in the grid, data indicative of an estimated sequence of samples likely to be received by the receiver over a plurality of times, the modifying based on a distance and a direction from the receiver to the potential location and a corresponding line of sight propagation of a signal transmitted from the potential location;
  generate, for each given potential location in the grid, a matrix corresponding to the given potential location and associating each receiver with the estimated sequence of samples generated for the receiver for the corresponding location in the grid; and
  compare the matrices corresponding to different potential locations to identify the matrix corresponding to potential location with the highest likelihood of real location of the transmitting source.

7. The system of claim 6, wherein the estimated sequence of samples Vkt(q) generated for a k-th receiver for a potential location q is calculated as:

$$Vkt(q)=zk(t-Dk(q))\exp(-j\theta q), \text{ where } \theta q=2\pi rk(t)T^*uk(q)/\lambda$$

where k ranges over 1 ... N (N being the number of sites), zk(t) is the sequence of samples obtained by the k-th receiver, uk(q) is a unit vector from the k-th receiver site to q, and Dk(q) is the propagation time from q to the k-th receiver site.

8. The system of claim 6, wherein the processor and memory module is configured to compare the matrices corresponding to different potential locations by calculating the norm of each matrix, wherein the potential location q corresponding to the matrix having the highest norm is identified as the potential location with the highest likelihood of real location of the transmitting source.

9. The system of claim 6, wherein at least one receiver M is configured to obtain a respective sequence of samples over a plurality of different positions along a trajectory using a moving antenna.

10. The system of claim 6, wherein the at least one receiver M is configured to obtain the sequence of samples over the plurality of different receiving positions along the trajectory by physical repositioning.

11. A computer program product comprising a program of instructions readable by a computer, the program of instructions for executing a method of locating a transmitting source in a multipath environment, the method comprising:
  obtaining, by each receiver K of a plurality of spatially separated receivers, a sequence of samples of a signal transmitted by the transmitting source and received by the receiver, each sample respectively associated with a time of obtaining said sample, wherein one or more receivers M among the plurality of receivers K each obtain a respective sequence of samples over a plurality of different receiving positions along a respective trajectory r(t) with respect to the site associated with the respective receiver M; and
  processing the obtained sequences of samples to identify the most likely location of the transmitting source,
  wherein said processing includes:
    obtaining data indicative of an area of interest divided into a grid of potential locations of the transmitting source;
    modifying the sequences of samples to generate, for each receiver and for each potential location in the grid, data indicative of an estimated sequence of samples likely to be received by the receiver over a plurality of times, the modifying based on a distance and a direction from the receiver to the potential location and a corresponding line of sight propagation of a signal transmitted from the potential location;
    generating, for each given potential location in the grid, a matrix corresponding to the given potential location and associating each receiver with the estimated sequence of samples generated for the receiver for the corresponding location in the grid; and
    comparing the matrices corresponding to different potential locations to identify the matrix corresponding to potential location with the highest likelihood of real location of the transmitting source.

* * * * *